United States Patent [19]
Leib

[11] Patent Number: 6,014,274
[45] Date of Patent: Jan. 11, 2000

[54] PARTIALLY ABLATING LASER RESISTANT STRUCTURES

[75] Inventor: Kenneth G. Leib, Wantagh, N.Y.

[73] Assignee: Northrop Grumman Corporation, Los Angeles, Calif.

[21] Appl. No.: 05/526,602

[22] Filed: Nov. 22, 1974

[51] Int. Cl.[7] .................................. G02F 1/36; G02B 5/30
[52] U.S. Cl. ......................... 359/886; 359/887; 359/890
[58] Field of Search .................................. 250/510, 514, 250/515, 517; 350/168, 267, 321, 276; 428/112, 913; 109/29; 219/121 L, 121 LM; 244/121, 117 A, 129 W; 102/105; 89/36 A; 165/47; 359/886, 887, 890

[56] References Cited

U.S. PATENT DOCUMENTS

| B1 527,669 | 1/1976 | Poulsen | 350/160 |
|---|---|---|---|
| 3,492,062 | 1/1970 | Hoover | 350/312 |
| 3,648,056 | 3/1972 | Bottweilar et al. | 350/276 SL |
| 3,649,426 | 3/1972 | Gates | 89/36 A |
| 3,764,277 | 10/1973 | Hollis | 89/36 A |

FOREIGN PATENT DOCUMENTS

| 1208213 | 10/1970 | United Kingdom | 350/312 |

OTHER PUBLICATIONS

Leib, "Determination of the Attenuation of Laser . . . ," Jan. 1973, pp. 1–59, NTIS Publ. AD756205.
Leib, "Laser Induced Thermal Lensing and Optical . . . ," Nov. 1971, pp. 5190–5191, Jour. of Appl. Phys., vol., 42, #12, QC1/J82.
Spencer et al, "1R Laser Radiation Eye Protector", Oct. 1972, pp. 1545–1546, Rev. Sci. Inst., vol. 43, #10.
De Ment, "Directed Energy Weapons", Aug. 1962, pp. 92–96, Electronic Industries.
"Radiation Goggles", Aug. 1965, p. 97, Aviation Week & Space Technology, vol. 83, #9.
Walkey et al, "Ablative Heat Shields . . . ", Sep. 1970, pp. 751, 775–6, 779–0, 785–6, 780, 783, Conference on Space Simulation.

*Primary Examiner*—Nelson Moskowitz
*Attorney, Agent, or Firm*—Terry J. Anderson; Karl J. Hoch, Jr.

[57] ABSTRACT

A multi-layer structure for controlling the transmission of laser radiation including outer and intermediate layers absorbent to incident laser radiation. The outer and intermediate layers ablate under the influence of the incident laser radiation to achieve substantial attenuation of on-axis transmission in an otherwise transparent structure.

20 Claims, 3 Drawing Sheets

PARTIALLY ABLATING LASER RESISTANT STRUCTURES

BACKGROUND

The present invention relates to a multi-layer structure for controlling the transmission of laser radiation, and more specifically to a multi-layer structure which partially ablates when exposed to laser radiation to effect significant attenuation thereof. This invention may be used in such structures as aircraft canopies and windshields, helmets and glasses.

The following co-pending applications are related to the present application:

1. "Beam Scattering Laser Resistant Structures", Ser. No. 526,604, filed simultaneously with the present application;
2. "Heat Conducting Laser Resistant Structures", Ser. No. 526,603, filed simultaneously with the present application; and
3. "Absorbent Laser Resistant Structure", Ser. No. 526,605, filed simultaneously with the present application.

In recent years there has been considerable interest in and a growing development of high intensity lasers. Optical radiation as used herein is meant any portion of the electromagnetic spectrum between about 0.4 and about 15.0 micrometers, and is not confined to the visible portion of the spectrum. Already, considerable effort has been directed toward the development of communication systems utilizing lasers while further technical development is being directed towardthe use of lasers as weapons against aircraft.

Many current optical devices are fabricated with glass, glass laminates, plastics and plastic laminates to achieve various effects under sunlight or artificial light conditions. Several of these devices have been designed with the idea that light will be diminished as it passes through the device. Many modern applications require these devices to transmit light in the visible portion of the spectrum but diminish light from high intensity laser radiation.

To date, laser weapons have two practical threat wavelengths:

1) approximately 10 micrometers (infrared), and,
2) the range 3 to 5 micrometers.

Depending upon the material exposed to the incident laser beam, the energy from each of these threat wavelengths will either be absorbed by or transmitted through the layer of material in the structure. In general, however, plastics will be absorbing to the 10 micrometer laser while some will transmit in the 3–5 micrometer range. Thus, based upon intelligence reports, different structures and/or materials may be employed according to which laser wavelength is anticipated.

One light disruptive device is disclosed in U.S. Pat. No. 3,561,842, to Horton. The structure relies on the heating effect of absorbed high-intensity optical radiation to destroy a film of light transmissive material which is bonded to a pre-roughened substrate. When high intensity optical radiation impinges on the film surface, the energy is absorbed and the film is destroyed, exposing the roughened substrate which deflects the beam. The roughened substrate is a source of possible shortcomings in that it presents additional steps in fabrication, difficulties in providing a continuous index of refraction and increased energy absorption due to the roughened surface. In addition the roughened substrate is a pre-induced damage control device whereas the present invention concerns a self-inducing damage mechanism.

Aircraft canopies and windscreens have generally been designed for aerodynamic and economic reasons rather than for laser weapon protection. They are constructed to incorporate the following characteristics:

a) Aerodynamic compatibility with the shape factor of the aircraft;
b) Structural soundness under prescribed aerodynamic environments;
c) Good visibility (transparency in the visible portion of the spectrum); and
d) Ease of fabrication.

However, in view of the developments in laser technology, it is now desirable that aircraft canopies and windscreens also:

e) be capable of withstanding laser radiation for a sufficient time (e.g. t>1 second) to enable the pilot to assume a change in aircraft attitude;
f) be aerodynamically sound to enable the pilot to carry out his assigned mission and/or return to his home base after having been exposed to some maximum level of radiation;
g) to reduce the on-axis level of radiation transmitted, thereby lowering the level of exposure to the pilot.

SUMMARY OF THE INVENTION

It is therefore an object of the present invention to provide laser radiation resistant structures for attenuating high energy laser radiation.

It is another object of the present invention to provide laser radiation resistant structures having improved radiating heat resistant and beam absorption properties.

It is a further object of the present invention to provide laminated structures having variable light transmission properties.

It is still a further object of the present invention to provide a laminated laser radiation resistant structure for protection in a high intensity laser radiation environment.

It is still another object of the present invention to provide a laminated structure for protection in a high intensity laser radiation environment in which the wavelength of the radiation is altered.

A laser resistant structure is provided for aircraft windscreens or canopies and the like which is capable of furnishing an aerodynamically functional form and also mitigating the effects of incident radiation by irreversible ablation of the outer and intermediate layers. The reduced effectiveness of the laser beam affords a pilot the time to assume a defensive attitude or an offensive posture. Further protection for the pilot and/or aircraft crew can be realized by providing these personnel with improved safety glasses and/or helmets which, in conjunction with the improved canopy and/or windscreen, would extend aircraft capability through increased pilot protection. The principle of operation of the several devices according to this invention emanates from self-destructing irreversible material processes resulting from the interaction of laser radiation and the outer and intermediate layers of the structure to subsequently inhibit on-axis transmission of the radiation.

According to the present invention, the level of radiation penetrating the laser resistant structure is reduced substantially by controlled absorption of the incident laser radiation and partial ablation of the multi-layer structure.

These and other objects, features, and advantages of the present invention will become apparent when the detailed description is considered with the drawings.

DETAILED DESCRIPTION OF THE PREFERRED EMBODIMENTS

Figure 1A:
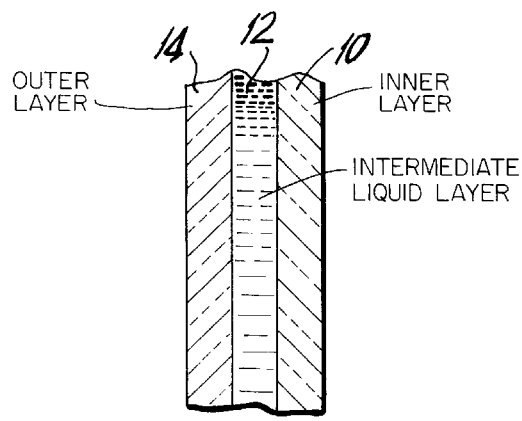
FIGS. 1a, 1b and 1c are partial sections in side elevation of one embodiment of the present invention including an intermediate layer of fluid.

Referring to FIG. 1, the partially ablating laser resistant structure can take the form of a liquid filled structure. The properties of the laminae and the liquid may be in one of many combinations depending upon the wavelength $\lambda_O$ or wavelengths of the incident high intensity laser radiation. FIG. 1a shows a three-layered structure in which the inner and outer layers, 10 and 14 respectively, form a container or cell for the intermediate layer of liquid, 12. The spacing between the outer and inner laminae is comparable to that normally occupied by a solid intermediate layer. The liquid in the spacing may be employed in an ambient or at rest condition, under static pressure, wherein the liquid layer is simply enclosed by the outer and inner layers, or it may be employed in a pressurized, closed system.

Figures 1B, 1C:
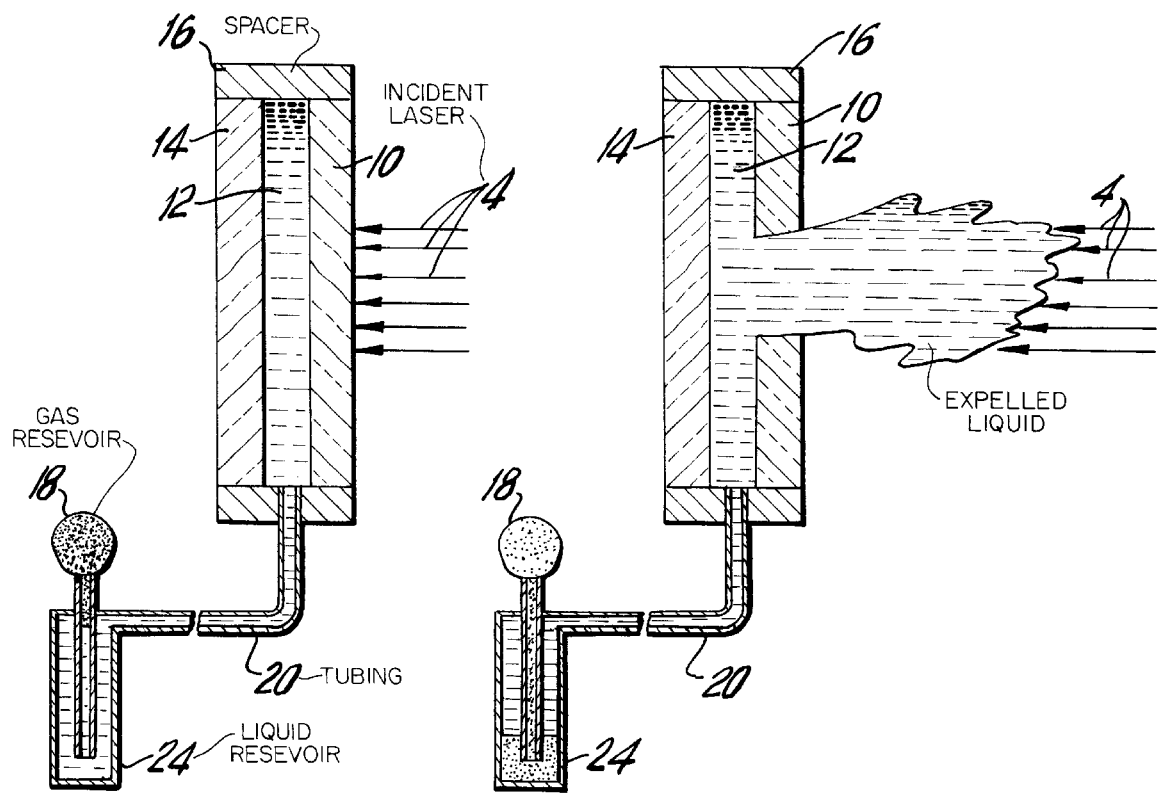

FIG. 1b depicts the inner and outer layers, 10 and 14, which transmit light in the visible portion of the spectrum and which are held a fixed distance apart by some convenient means. An example of such means, schematically shown as 16 in the figure, is a form of plate to which the two laminae 10 and 14 are attached. The support 16 may be provided with means whereby the liquid is maintained under pressure by a reservoir of the liquid or a reservoir of pressurized gas or both. Advantageously, the liquid cell portion of the laser resistant structure is connected by hydraulic tubing 20 to a liquid reservoir 24 which may be backed up with a gas reservoir 18 to keep the entire liquid system under pressure.

Figure 6:
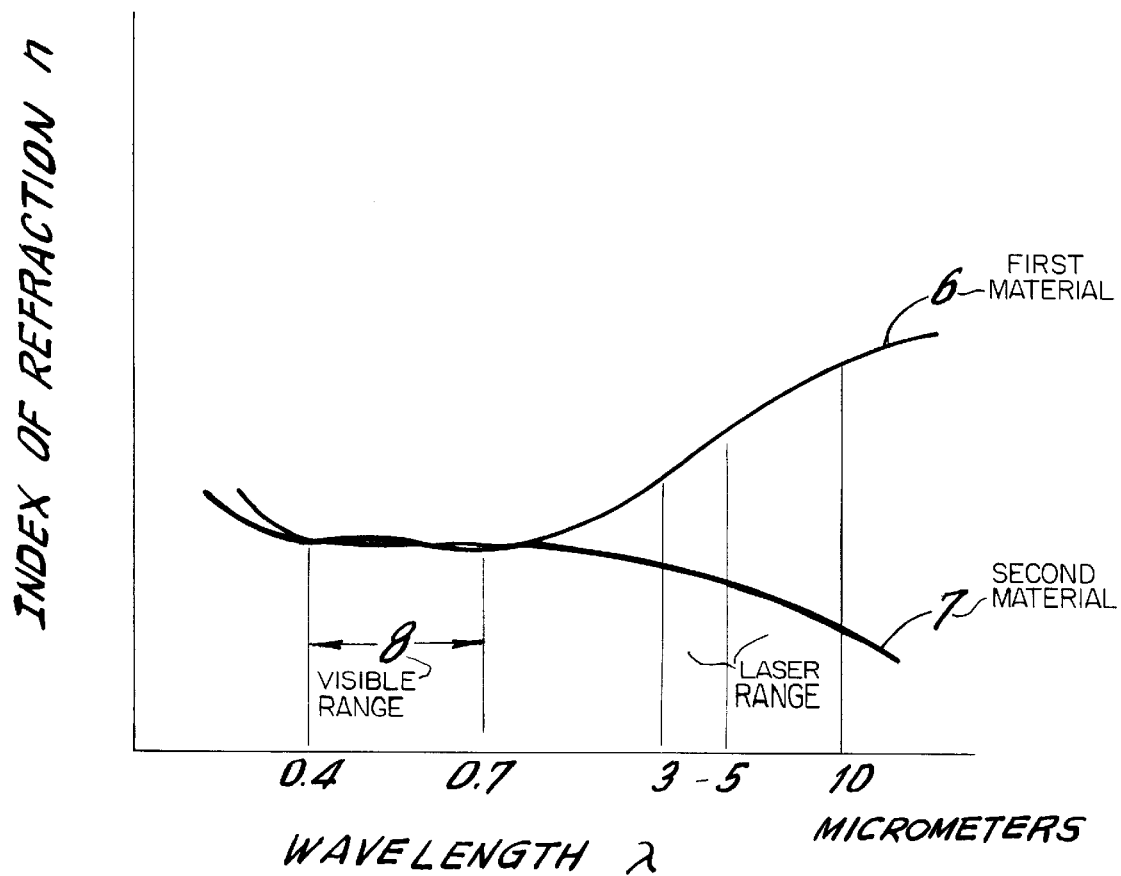
FIG. 6 illustrates an optical property of different materials having substantially equal indicies of refraction in the visible portion of the electromagnetic spectrum.

The space between the layers is filled, or capable of being filled with a liquid, or a mixture of liquids whose resultant index of refraction is substantially equal to the index of refraction of the two surrounding layers when measured at the wavelengths of visible light. As depicted in FIG. 6, the outer layer and the liquid may be transparent at the same wavelength only in the visible portion of the spectrum. Typical materials include plexiglass for layers 10 and 14, and a mixture of water and ethylene glycol for the liquid. When properly mixed, the liquid can be made to have an index of 1.49 which is the value of the index for plexiglass in the visible range.

In operation, laser radiation, 4, incident on the outer layer will be absorbed thereby, causing it to ablate. After sufficient time, for example t=1 second, the laser beam will penetrate the outer layer, exposing the intermediate liquid layer. The liquid will begin emptying through the hole cut by the laser beam as shown in FIG. 1c either simply as a result of the pressure generated by the liquid above the hole or as a result of the pressure reservoir where one is employed. The liquid leaves the structure in a continuous stream, to fill the hole cut by the laser beam and absorb the energy from further incident laser radiation, thus preventing total penetration of the laser beam before a change in aircraft attitude should have been executed.

Thus, according to intelligence reports regarding anticipated threat wavelengths of lasers, a liquid which is absorptive to the anticipated threat wavelength can be selected. Examples include ethylene glycol as the 3 to 5 micron range or even a mixture of water and ethylene glycol, and water for the 10 micron laser. Furthermore the outer layer should also be absorptive to the anticipated threat wavelength. Examples include plexiglass which is absorptive to both the 3 to 5 micron laser and the 10 micron laser. Fused silica is useful for lasers of a wavelength of about 4 microns or below. Furthermore, an outer layer of fused silica is particularly useful because it not only requires a relatively long time before burnthrough but also results in a cleanly burned hole to help keep the liquid in a proper stream.

According to another aspect of the present invention, liquids may be employed which react under the influence of heat-generated by the laser beam—to seal the hole left by the laser's damage. A particularly useful embodiment according to this aspect includes plexiglass as the outer layer and methyl alcohol for the intermediate layer of liquid. While the laser beam is incident on the structure, the heat generated in the outer layer will cause the liquid in contact with the hole to seal the hole when the laser is removed and the surface cools.

Referring now to FIG. 2, another embodiment of the present invention consists of a structure having one or more intumescing layers. This form of the laser resistant structure can be appreciated by first describing a new use for an existing structure and by examining the principle factor which limits its use and which limitation is overcome by another aspect of the present invention.

Figure 2A:
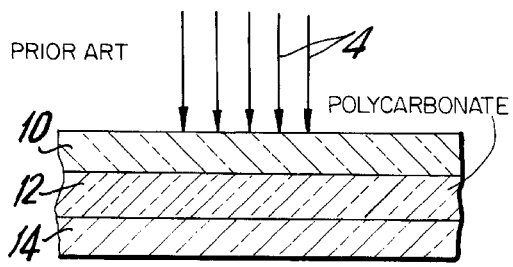
FIGS. 2a, 2b and 2c are cross-sectional views of another embodiment of the present invention including an intermediate layer of intumescing material.

Referring now to FIG. 2a, a currently used form of a three-ply windscreen laminate comprises layers 10 and 14 which could be either plexiglas 55 or glass and intermediate layer 12 which is conveniently made of a polycarbonate form of acrylic. When high intensity laser radiation is incident upon this structure, significant attenuation of the laser is effected by the mechanism of intumescence to form carbon. Accordingly, in a typical structure, the relative physical characteristics of the three-ply laminate configuration would be as follows:

1. Modulus of elasticity:

$$E_{10} \cong E_{14} >> E_{12}$$

2. Absorption coefficient:

$$\alpha_{14} > \alpha_{12} >> \alpha_{10}$$

3. Intumescing characteristics as a measure of degree of carbon formation or pyrolysis rate, $r_P$:

$$r_{P12} >> r_{P14} \cong r_{P10}.$$

Figure 2B:
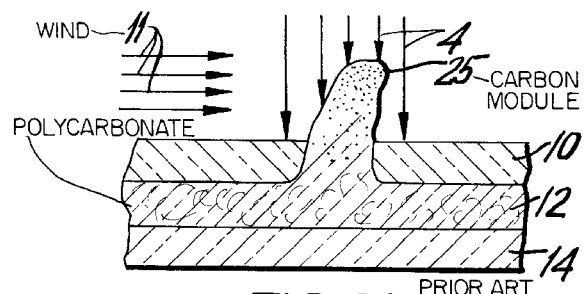

In FIG. 2b, high intensity laser radiation 4, of wavelength $\lambda_O$, is incident upon lamina 10. When the absorption of the incident radiation by lamina 10 is high enough, little or no radiation is transmitted so that an ablative process takes place eroding that portion of lamina 10 falling within the confines of the illuminating radiation. After eroding lamina 10, the high intensity laser radiation interacts with the polycarbonate of lamina 12 converting the polycarbonate into carbon in the form of a carbon nodule.

The intermediate layer is constructed of an intumescing or high pyrolysis material which is converted to carbon under the influence of incident laser radiation either directly or by oxidation, according to the process:

$$[\text{Material}] + \Delta\varepsilon \xrightarrow{\text{incident}} C + \text{gas} + \Delta\varepsilon_{broadband}$$

where $\Delta\varepsilon_i$ represents the energy of the incident beam, C is carbon, $\Delta\varepsilon_{broadband}$ is the energy of the emitted beam which is in a range of wavelengths different from the incident beam and the gas consists of vapor and decomposition products of the material. Since both the melting and vaporization temperatures for carbon are relatively high, the energy from the further incident laser beam is absorbed for raising the carbon temperature, rather than further destroying the structure. In addition, the emitted beam is at different frequencies than the incident beam and is scattered. FIG. 2b shows the laminated structure after the carbon nodule 10 has formed.

Figure 2C:
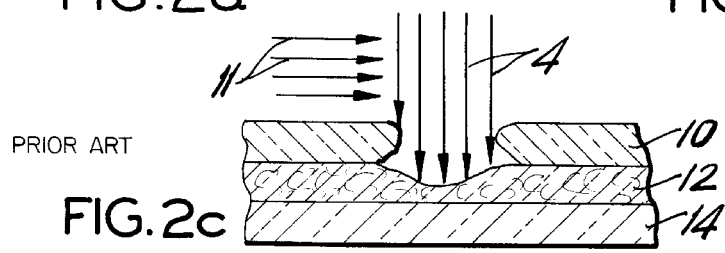
Figure 3A:
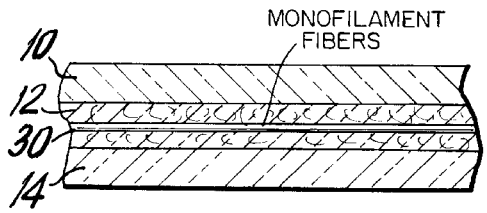
FIGS. 3a, 3b and 3c are cross-sectional views of another embodiment of the invention showing supporting filaments in the intumescing layer.
Figure 3B:
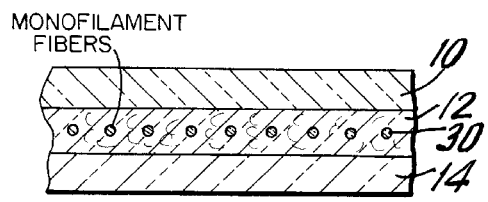

In an important application of this structure, strong winds, 11, are often present and directed such that the carbon nodule is removed or destroyed. Without the nodule, incident high intensity laser radiation can continue ablating the structure. This is shown in FIG. 2c. Another aspect of the present invention provides an improved intumescing structure which will withstand high intensity laser radiation in this application whereby means are supplied to retain or hold all or part of the carbon nodule so that it remains substantially intact to absorb energy from the incident beam, thus mitigating further effects of the radiation. FIGS. 3a and 3b show two views of the placement of monofilaments 30 in layer 12. Layers 10, 12 and 14 are composed of materials similar or identical to those described with reference to FIG. 2. The monofilaments are composed of a material which has a lower ablation rate than that of the host material of layer 12 and must have an index of refraction in the visible portion of the electromagnetic spectrum which is substantially identical to that of the host material in the same region. However, at the wavelength of the incident high intensity laser radiation, these indices will be different as shown in FIG. 6.

Although the monofilaments 30 are shown imbedded in layer 12 parallel to the laminae surfaces, the monofilaments can be dispersed in one or more layers and can be laid in any geometrical pattern or weave. Such a configuration of layering or weaving is possible because the index of refraction of the monofilaments in the visible portion of the electromagnetic spectrum is equal or nearly equal to that of the host material, preserving the integrity of laminated structure's transparency to visible light.

A particularly useful combination includes fused silica monofilaments in the intermediate layer or in both the intermediate and outer layers and a slow ablating material for the outer layer, e.g. fused silica. The use of this material enhances the resistance of the structure to laser radiation because it requires a substantial period of time to burn through, thus protecting for that time, and also it exhibits a "clean" burn when exposed to laser radiation so that the carbon nodule is retained in the pocket and protected from the wind.

Figure 3C:
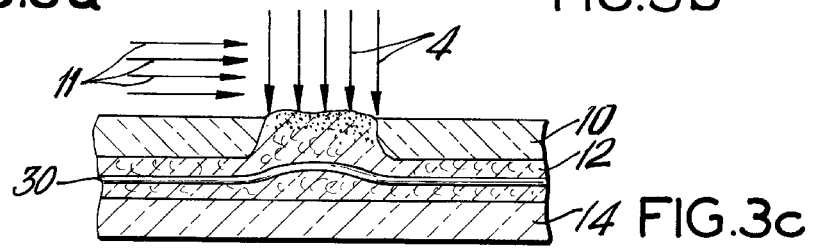

The monofilaments inhibit the destruction of the carbon nodule by fusing into the carbon, retaining it, even under the influence of a heavy wind as shown in FIG. 3c. Thus, the monofilament array performs three functions:

a) increases the mechanical strength of a given structure;
b) increases the laser radiation resistance of the structure; and
c) retains the intumescence products by fusing to them to further enhance the radiation resistance of the structure.

Figure 4:
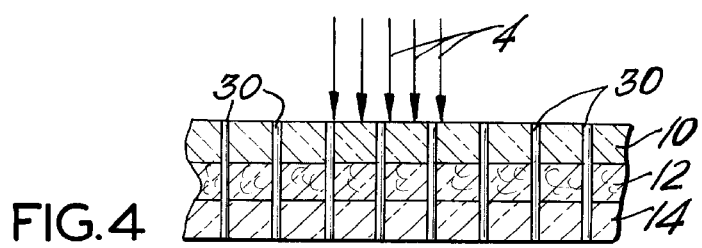
FIG. 4 shows a cross-sectional view of an alternative filament embedded embodiment according to the present invention.

An alternative arrangement of monofilaments is shown in FIG. 4 wherein the lengths of the monofilaments are laid perpendicular to the surfaces of the layers. In this configuration, the monofilaments serve not only the above recited functions but also act as a heat transfer mechanism to transfer some heat away from the incident surface, thus further mitigating the damaging effect of the beam.

The intumescence form of the present invention can be adapted for use in both the 10 micron and the 3 to 5 micron range of anticipated threat laser wavelengths since most materials which can be used as intumescing layers are absorptive to both wavelengths. Thus, in the 3 to 5 micron range, the outer layer can, for example, be plexiglas since it is absorptive at that range and will ablate to expose the intumescing layer. In the 10 micron range of laser radiation, the intermediate layer may be a polycarbonate, while the outer layer is preferably a slow ablating material such as fused silica. The slow ablating material not only protects the pilot and his equipment for a longer time, since it requires substantial time for burn-through, but also produces a clean burn which aids the retention of the carbon nodule formed when the laser strikes the intermediate layer.

According to another aspect of the present invention, there can be a double intumescing laser resistant structure for even further laser attenuation. The outer layer is made of a low-char, hard-char pyrolyzing material (i.e. low carbon formation) such that the necessary structural rigidity will be maintained and there will be the added attenuation mechanism of the outer layer exhibiting intumescence. Material selection is limited only by chemical compatability between the materials of adjacent layers. Thus, the outer layer will be converted to carbon under the influence of theincident laser radiation although it will be a small quantity but hard. The intermediate layer is made of a polycarbonate as described above such that when the laser penetrates the outer layer, this material will further absorb the laser's energy, being converted to carbon. A particularly useful combination comprises polyisouranate as the outer layer, a polycarbonate as the intermediate layer and plexiglas as the inner layer. Furthermore, as described above, monofilaments can be embedded in one or both of the intumescing layers to assist in retaining the carbon nodule.

The following chart shows particularly useful pyrolysis agents which may be incorporated into the intumescing layers of the present invention:

| High Char Yield | Polyphenylene |
| | Phenolic-novolac |
| ↓ | Phenophthaleine polycarbonate |
| | Epoxy-boroxine |
| | Epoxy-novolac |
| Low Char Yield | Bisphenol a polycarbonate. |

Accordingly, depending on the anticipated threat wavelength, these agents can be used in a structure using a single layer of intumescing material, or in a structure using a combination of two layers of intumescing material or in a structure wherein the outer layer is a solid polymer of one of these materials and the intermediate layer is a liquid monomer of one of these materials.

Figure 5:
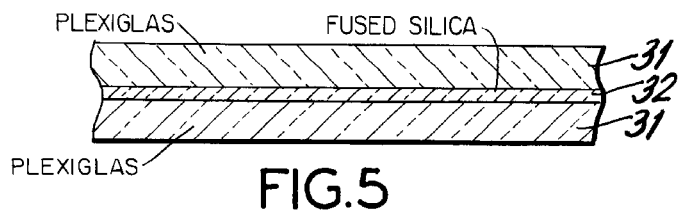
FIG. 5 is a cross-sectional view of still another embodiment of the present invention including a hardening intermediate layer.

Referring now to FIG. 5, there is shown the hardened structure configuration which has been found to be particularly resistant to laser radiation of either threat wavelength. This combination of materials consists of a thin sheet of fused silica 32 bonded between plexiglas 31. The resultant structure is more resistant to radiation penetration than a plexiglas-acrylic laminate, a typical windscreen configuration. Incident laser radiation is absorbed by all the layers of the structure which exhibits a ten-fold increase in burn-through time as compared to an equivalent thickness of plexiglas. Tests indicate that some material interaction must be occurring since the burn-through time for the fused silica-plexiglas laminate is twice the sum of the burn-through times for fused silica and plexiglas taken individually. Since thick fused silica will fracture, this embodiment offers a further advantage in that fabrication into a thin sheet between the plexiglas allows the proper flexibility for the structure.

Referring now to FIG. 6, there is shown a typical distribution of the index of refraction for different materials as it varies with wavelength. Curve 6 represents the index of refraction distribution for one material, for example the intermediate layer, and curve 7 represents the index of refraction distribution for another material, for example the monofilament fibers. The range of wavelengths labeled 8 represents the visible portion of the electromagnetic spectrum. It is apparent that when one considers the index of refraction at wavelengths of laser radiation, e.g. 3–10 micrometers, there is a significant difference between the material represented by curve 6 and that represented by curve 7. Thus, when a laser beam is transmitted from one material to the other, it will be diffracted away from the axis of its incidence.

The above described aspects of the present invention were discussed with reference to a three-layered structure. It should be understood by these skilled in the art that these embodiments are merely illustrative and that various modifications can be made in construction and arrangement within the scope of the invention as defined in the appended claims.

What is claimed is:

1. A multi-layer laser resistant structure comprising:
    an outer layer;
    an inner layer;
    means for maintaining said outer layer and said inner layer a generally fixed distance apart;
    a liquid filling the space between said outer layer and said inner layer to form a generally intermediate liquid layer; and
    means for hermetically sealing the space between said inner and outer layers to contain said liquid, said inner and outer layers and said liquid having essentially equal indices of refraction in the visible portion of the electromagnetic spectrum, said outer layer and said liquid being generally highly absorptive to laser radiation such that said outer layer is adapted to become irreversibly ablated under the influence of laser radiation incident thereon, with said liquid adapted to pass through any hole generated in said outer layer by laser radiation incident thereon, and such that said outer layer and said liquid are adapted to react under the influence of the incident laser radiation to seal each said hole when said structure cools.

2. The laser resistant structure according to claim 1 which includes pressure means for maintaining the liquid under pressure.

3. The laser resistant structure according to claim 2 wherein said pressure means comprises a reservoir of the liquid connected to a source of gas under pressure.

4. The laser resistant structure according to claim 1 which includes a liquid reservoir and a circulating pump.

5. The laser resistant structure according to claim 1 wherein the outer and inner layers are plexiglas and the liquid intermediate layer is a mixture of water and ethylene glycol having an index of refraction of about 1.49 in the visible portion of the electromagnetic wave spectrum.

6. The laser resistant structure in accordance with claim 1 wherein said outer layer is plexiglas and said intermediate layer is methyl alcohol.

7. A multi-layer laser resistant structure comprising:
    an outer layer of substantially transparent material;
    an inner layer of substantially transparent material;
    means for rigidly maintaining said outer and intermediate layers a fixed distance apart;
    means to hermetically seal the space between said inner and outer layers;
    liquid filling the space between said outer and inner layers, said outer and inner layers and said liquid having substantially equal indices of refraction in the visible portion of the electromagnetic spectrum;
    at least two resevoirs containing different liquids, each liquid being substantially highly absorptive to different threat wavelengths of incident laser radiation but having substantially the same indices of refraction as said inner and outer layers; and
    valve means and pump means to enable an operator to control which of said liquids is contained within the space between said outer and inner layers in accordance with anticipated threat laser wavelengths,
said outer layer being generally highly absorptive to incident laser radiation, such that said outer layer is irreversibly ablated under the incidence of laser radiation to permit the liquid contained in the space between said inner and outer layers to pass through a hole in said outer layer, generated by ablation of said outer layer, for absorbing energy associated with the incident laser radiation and providing significant attenuation of the incident laser radiation.

8. A multi-layer laser resistant structure, comprising:
    an outer layer substantially absorptive to incident laser radiation;
    an intermediate layer of generally high pyrolyzing material which is substantially transformed into carbon when exposed to laser radiation; and
    an inner layer,
said inner, intermediate and outer layers having substantially equal indices of refraction in the visible portion of the electro-magnetic spectrum and said outer layer being adapted to absorb substantially all of the laser radiation incident thereon until it ablates to expose said intermediate layer to the incident laser radiation to form a carbon nodule under the incidence thereof, said carbon nodule absorbing substantially all further incident laser radiation to raise its temperature and transmit any laser radiation penetrating the carbon nodule at a range of wavelengths essentially different from the incident laser radiation, such that said laser resistant structure provides significant attenuation of incident laser radiation.

9. A laser resistant structure according to claim 8, which further includes monofilament fibers embedded in said intermediate layer, said monofilament fibers having a greater burn-through time than that of said intermediate layer for fusing to said carbon nodule upon exposure to incident laser radiation to inhibit removal of said carbon nodule.

10. A multi-layer laser resistant structure comprising:

an outer layer of a generally low char-hard char pyrolysis agent;

an intermediate layer of a generally high pyrolysis agent; and an inner layer, said inner, intermediate and outer layers having substantially equal indices of refraction in the visible portion of the electro-magnetic spectrum and said outer and intermediate layers being generally highly absorptive to incident laser radiation such that said outer layer exhibits intumescence under the incidence of laser radiation to substantially attenuate the incident laser radiation.

11. A multi-layer laser resistant structure comprising:

an outer layer of plexiglas;

an intermediate layer of fused silica; and an inner layer of plexiglas, such that said inner, intermediate and outer layers having substantially equal indicies of refraction in the visible portion of the electromagnetic spectrum and said outer and intermediate layers being highly absorptive to incident laser radiation whereby said outer and intermediate layers are irreversibly ablated under the influence of incident laser radiation to provide significant attenuation thereof.

12. The laser resistant structure in accordance with claim 9, wherein the outer layer is plexiglas and the monofilaments are fused silica.

13. The laser resistant structure in accordance with claim 9, wherein the monofilaments are embedded in the intermediate layer parallel to the structure's surface.

14. The laser resistant structure in accordance with claim 9, wherein the monofilaments are embedded in the outer, intermediate and inner layers said monofilaments being placed perpendicular to surface of said layers.

15. The laser resistant structure in accordance with claim 9, in which the outer layer is fused silica.

16. The laser resistant structure in accordance with claim 10 in which monofilament fibers having a greater burn-through time than the outer layer are embedded in the outer layer.

17. The laser resistant structure in accordance with claim 10 in which monofilament fibers having a greater burn-through time than both the outer layer and the intermediate layer are embedded in both the outer layer and intermediate layer.

18. The laser resistant structure in accordance with claim 10 in which monofilament fibers having a greater burn-through time than the intermediate layer are embedded in the intermediate layer.

19. The laser resistant structure in accordance with claim 18 in which the monofilaments are step index fused silica and the outer layer is polyisouranale.

20. The method of attenuating high intensity laser radiation by interposing in front of a laser beam a multi-layer structure comprising an outer, an intermediate and an inner layer, said outer layer being substantially absorptive to incident laser radiation and said intermediate layer being a high pyrolyzing material whereby said laser beam is absorbed by said outer layer to expose the intermediate layer which absorbs substantially all of said laser beam and is converted into a carbon nodule which absorbs substantially all further laser radiation to raise the temperature of the carbon nodule and transmit such laser radiation as penetrates the carbon nodule at a range of wavelengths different from the incident laser radiation.

* * * * *